F. E. ARNDT.
STEERING GEAR FOR ROAD MACHINES.
APPLICATION FILED MAY 9, 1918.
Reissued Sept. 5, 1922.
15,443.
2 SHEETS—SHEET 1.
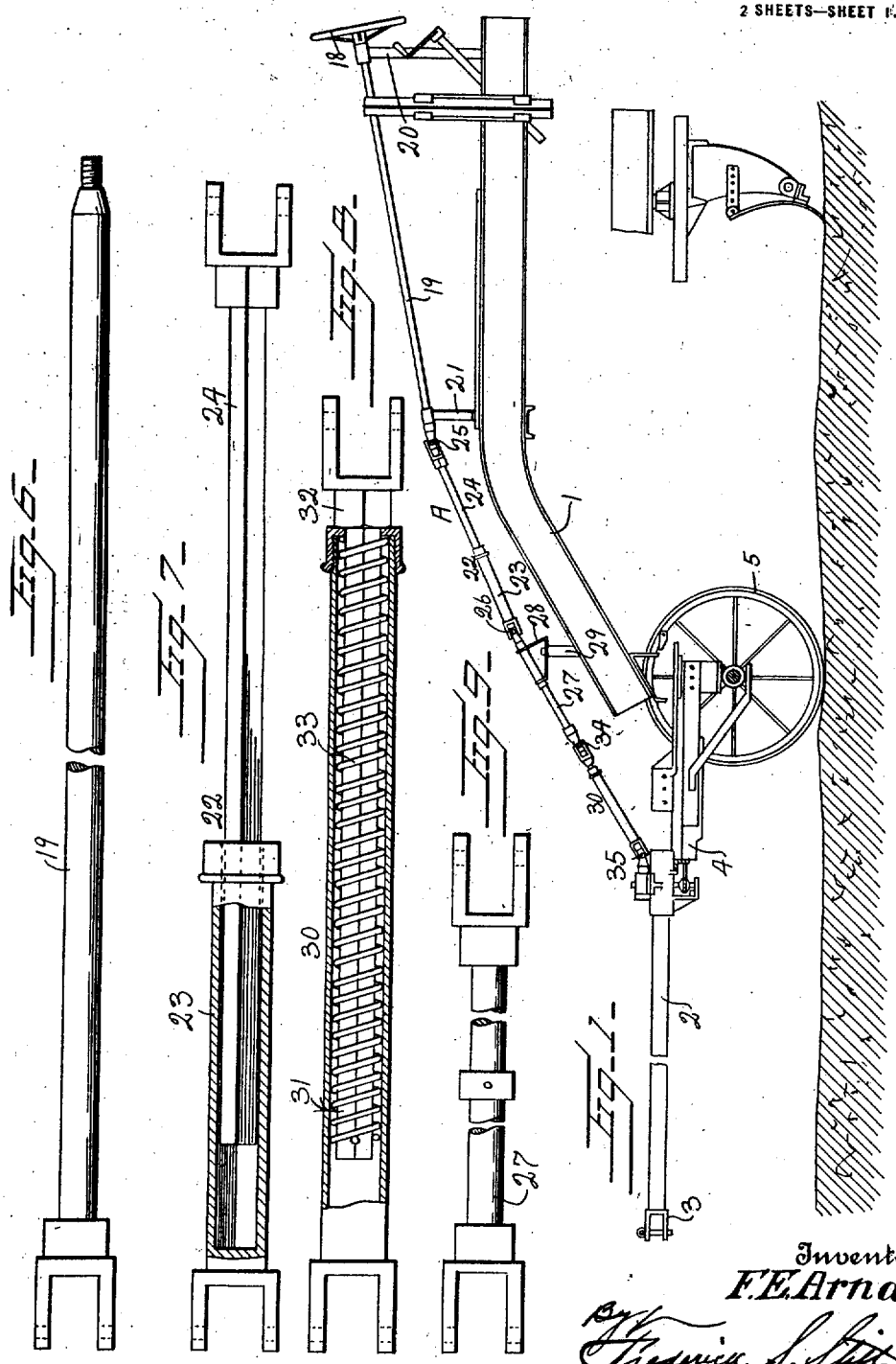
Inventor
F. E. Arndt
By Frederick S. Stitt
Attorney F. E. ARNDT.
STEERING GEAR FOR ROAD MACHINES.
APPLICATION FILED MAY 9, 1918.
Reissued Sept. 5, 1922.
15,443.
2 SHEETS—SHEET 2.
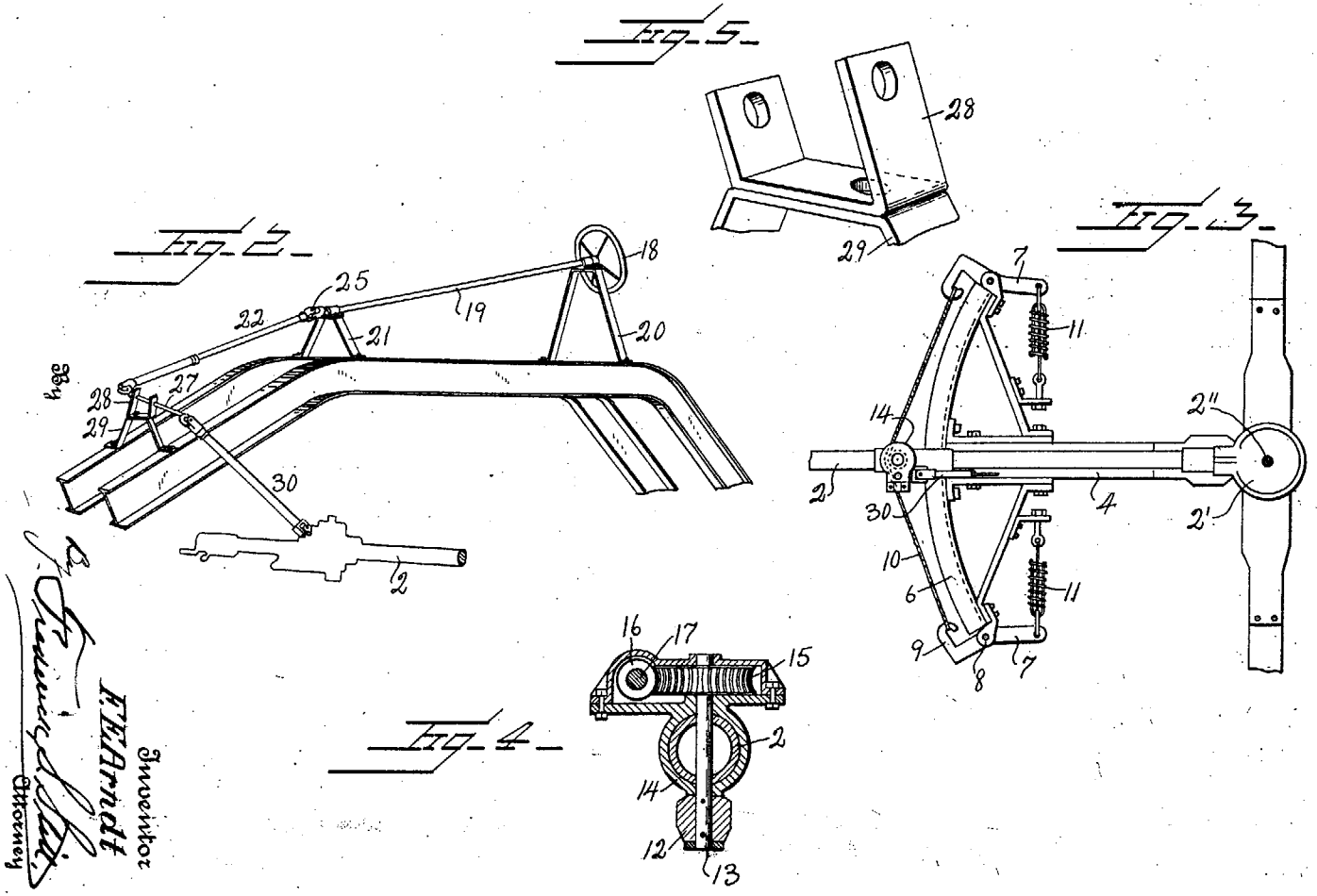
Inventor
F. E. Arndt
By Frederick S. Stitt
Attorney Reissued Sept. 5, 1922. Re. 15,443

UNITED STATES PATENT OFFICE.

FRANKLIN E. ARNDT, OF GALION, OHIO, ASSIGNOR TO THE GALION IRON WORKS AND MANUFACTURING COMPANY, OF GALION, OHIO, A CORPORATION OF OHIO.

STEERING GEAR FOR ROAD MACHINES.

Original No. 1,166,036, dated December 28, 1915, Serial No. 48,483, filed September 1, 1915. Application for reissue filed May 9, 1918. Serial No. 233,580.

*To all whom it may concern:*

Be it known that I, FRANKLIN E. ARNDT, a citizen of the United States, and a resident of Galion, in the county of Crawford and State of Ohio, have invented certain new and useful Improvements in Steering Gears for Road Machines, of which the following is a specification, reference being had to the accompanying drawings.

This invention comprehends certain new and useful improvements in steering gear for road machines, and relates more particularly to improvements in that type of steering gear in which means are provided for a lateral adjustment of the draft or engine pole with respect to the front or steering axle of the road machine.

As is well known to those familiar with the operation and practical use of machines of this character, it is customary to draw the machine along the road by means of a traction engine which travels in the middle of the road to obtain the best traction effect, whereas the road machine must travel at the sides of the road and means must, therefore, be provided to secure the best results, whereby the line of travel of the road machine may be easily maintained regardless of the relative position of the traction engine. For this purpose, the road machine is provided with a draft pole which is not rigidly connected with the front axle, as in the ordinary vehicle, but is laterally movable or shiftable relative thereto, means being provided whereby the operator, standing for example, upon the platform at the rear of the road machine, may manually adjust the position of the pole relative to the machine, so that the desired line of draft of the road machine may be easily maintained irrespective of the angular or oblique position which is assumed by the draft pole.

Difficulty has heretofore been encountered, with steering gear of this character, owing to the fact that the flexible shaft designed for manual operation under the control of the operator of the road machine and arranged to shift the draft pole to the right or to the left as required, has been incapable of permitting the machine to make very sharp turns as, for example, in going around a corner, it being sometimes necessary to turn the front axle through an arc of at least 300°, and consequently some of the parts have had to be unshipped while the turn was being made and again reassembled, this manifestly, being a source of inconvenience and detracting from the smooth working qualities of the machine.

The present invention aims entirely to do away with the difficulties above referred to, and to provide a novel and useful construction of flexible shaft which will insure the proper working of the parts at all times, and which can be easily and cheaply manufactured, which will be durable, and which will not be liable to get out of order.

A further object of the invention is an improved steering gear of this type, in which a portion of the flexible shaft of the steering gear is journaled in or upon a laterally swinging bracket, said bracket being of prime importance in imparting to the shaft the required flexibility whereby the necessary sharp turns may be made.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawings, in which Figure 1 is a side elevation of so much of a road machine, as is necessary to indicate the character of the machine and to impart a thorough understanding of the improvements of the present invention.

Fig. 2 (Sheet 2) is a perspective view in the nature of a diagram showing the draft pole turned at a sharp angle to the main supporting frame of the machine.

Fig. 3 is a plan view of portions of the steering gear hereinafter specifically referred to.

Fig. 4 is a detail transverse sectional view through the worm gearing employed.

Fig. 5 is a detail perspective view of the swinging bracket and its arch.

Fig. 6 is a detail view of one of the shaft sections.

Fig. 7 is a similar view of another section of the flexible operating shaft of the apparatus.

Fig. 8 illustrates still another section of said shaft, and

Fig. 9 is a detail view of a swinging arm employed.

Corresponding and like parts are referred to in the following description and designated in the different views of the accompanying drawings by like reference characters.

Referring to the drawings, the numeral 1 designates the frame bars of a road machine, 2 the draft or engine pole which is so mounted that it may be shifted laterally with respect to the front axle of the machine as, for example, by being provided at its rear end with a plate 2′ pivoted upon the king bolt 2″, said draft pole being provided at its forward end with a clevis 3 whereby it may be readily secured to the draft bar of a traction engine, and 4 designates a relatively short tongue which is rigidly secured to the front axle in any desired or approved way and by the turning of which to the right or to the left the front ground or traveling wheels 5 are steered.

Carried by the tongue 4 is an arcuate bar 6, to the ends of which levers 7 are pivotally connected intermediate of their ends, as indicated at 8, said levers having inwardly turned hooked ends 9, to which the ends of a sprocket chain 10 are connected; and secured to the other and rear ends of the levers 7 are spring tension members 11, designed to hold the chain 10 taut, and to compensate for any shocks. The chain 10 passes over and across a pinion 12 secured to the lower end of a vertically disposed spindle 13 mounted in a gear casing 14 supported upon the pole, and the spindle 13 carries at its upper end a worm gear 15, which meshes with a worm 16 formed on or secured to a longitudinally disposed short shaft section 17, which forms a member of the flexible operating shaft hereinbefore referred to and designated "A" as a whole. This shaft, as best illustrated in Fig. 1, extends rearwardly over and above the framework of the road machine, and is provided at its rear end with a hand wheel 18 arranged in convenient proximity to the platform (not shown) at the rear of the machine upon which the operator stands to control not only the steering gear but the other parts of the machine, as will be clearly understood by those familiar with this class of machinery.

From the foregoing it will be seen that by turning the shaft "A" in the required direction the spindle 13 will be turned and the chain 10, through the instrumentality of the spur pinion 12, will be rotated to move the chain 10 laterally and thereby cause a lateral shifting of the draft pole relative to the tongue 4 and front axle of the road machine.

By the use of worm gearing within the casing 14, it is obvious that no separate or independent locking devices are necessary to maintain the parts in their adjusted positions, which is an incident of advantage.

The present invention relates more particularly, as indicated at the outset of the specification, to the construction an arrangement of parts or members of the flexible shaft "A," whereby the machine may be turned around relatively sharp corners with facility and without the necessity of any unshipping of the parts, and I shall now proceed to describe these features in detail.

The rearmost member or section of the flexible shaft "A" is designated 19, and is in the form of a rod mounted for rotation upon its longitudinal axis in a rear arch 20, and an intermediate arch 21 straddling and supported upon arched frame bars 1 as best illustrated in Fig. 2. The intermediate section or member of the shaft "A" is designated 22 and is formed of telescopic sections 23 and 24, the tubular section 23 having the section 24 extensibly mounted therein, both members being so shaped as best illustrated in Fig. 7, as to compel them to rotate together, which is, of course, necessary for the successful operation of the shaft. The adjoining ends of the shaft members 19 and 22 are connected together by a universal joint 25 and the lower forward end of the intermediate member 22 is similarly connected, as at 26, to a laterally swinging arm 27 mounted to rotate in a bracket 28 which is formed with relatively short and long arms as clearly illustrated in Figs. 1, 2 and 5, and pivotally mounted eccentrically (that is, nearer one arm than the other) upon a transversely disposed bracket arch 29 secured in any desired way to the forward portions of the frame bars 1. The foremost member 30 of the shaft "A" is likewise telescopic in nature and comprises a tubular section 31 and a solid section 32 extensibly mounted therein, a spring 33 being coiled around the section 32 and received within the section 31 and exerting such a tension on the sections as to contract them or draw one within the other. This member 30 is connected to the lower end of the forwardly and downwardly inclined swinging arm 27 by means of a universal joint 34 at one end and at its other end is connected by a universal joint 35 to the short shaft section or member 17 carrying the worm 16, before referred to. Preferably the arm 27 is journaled in the laterally swinging bracket 28 nearer one end of the arm than the other, as clearly shown in the drawings, whereby the forwardly and downwardly projecting portion of said arm, where it is connected to the foremost member 30 of the flexible shaft "A" may project laterally out over the framework of the machine to provide a clearance so as to permit the telescopic member 30 to pass under the frame, if required, in the turning movement and the extensible or telescopic member 22 also co-operates in this movement of the parts, as is manifest, whereby the machine may be turned about without the necessity of unshipping any of the parts, and without any members binding or becoming dislocated. By providing a spring 33 within the telescopic member 30, the same tending to contract or close by this means, it is held properly rigid in its work and is prevented from swinging around which would render the slip joints liable to come apart.

From the foregoing description in connection with the accompanying drawings, it will be seen that I have provided a very efficient as well as durable steering gear which will overcome the disadvantages set forth near the outset of the specification, and by the use of which the parts will be always maintained in proper operative operation to each other and without danger of binding in any way or of coming apart.

While the accompanying drawings illustrate what I believe to be the preferred embodiment of my invention, it is to be understood that the invention is not limited thereto, but that various changes may be made in the construction, arrangement, and proportions of the parts without departing from the scope of the invention as defined in the appended claims.

What is claimed is:

1. In a road machine, steering mechanism including a draft pole, a tongue, a connection between said draft pole and tongue whereby the latter may be turned relatively to the former, an operating shaft for said connection, said shaft embodying extensible members, a rotatable arm having universal joint connection with said members and located between the same, a bracket arch, and a laterally swinging bracket mounted upon said arch and in which said arm is journaled.

2. In a road machine, steering mechanism including a draft pole, a tongue, a connection between the two whereby the tongue may be moved to different angular adjustments relative to the pole, a flexible operating shaft for said connection, said shaft embodying members each of which is constructed of telescopic sections and one of said members being provided with a spring tending to close its sections together, an arm mounted between said extensible members and having universal joint connection therewith, and a laterally swinging bracket in which said arm is mounted for rotary movement.

3. In a road machine, steering mechanism including a draft pole, a tongue, a connection between the two whereby the tongue may be moved to different oblique positions relative to the pole, a flexible operating shaft for said connection, said shaft embodying a rear rotatable member adapted to be manually turned, supporting means for said member, an intermediate member having universal joint connection with the rear member, said intermediate member consisting of sections telescopically connected together, a forwardly and downwardly inclined arm having universal joint connection with the forward end of the intermediate member, supporting means for said arm permitting the same to be turned laterally and allowing for the rotary movement of said arm, and a forward member having universal joint connection at its rear end with the forwardly and downwardly extending end of said arm, said last named member being also constructed in telescopically arranged sections.

4. In a road machine embodying frame bars, a tongue, a draft pole and a connection between the tongue and draft pole whereby the former may be turned to different oblique positions relative to the latter, an operating shaft for said connection, said shaft embodying a plurality of members having universal joint connections between their ends, said members including a telescoping intermediate member, a telescoping forward member, and an arm between said members, a bracket arch carried by the frame bars, and a bracket pivotally mounted near one side upon said arch, the arm being journaled near one end in said bracket, as and for the purpose set forth.

5. In a road machine, laterally disposed frame bars, a front or steering axle, a draft pole oscillatable laterally relative to the axle, and means for moving said draft pole to different angular positions relative to the line of draft of the machine including an operating shaft comprising a plurality of flexibly connected sections, one of said sections intermediate the ends of the shaft being relatively short, and means for supporting said short shaft section comprising an oscillatable bracket disposed above the laterally disposed frame bars and having its axis of oscillation approximately coincident with the axis of oscillation of the tongue, the short shaft section being journalled for axial rotation within the bracket, the forward portion of said short shaft section, when the bracket is turned to carry the shaft section approximately at right angles to the line of draft, projecting beyond said frame bars.

6. In a machine of the character described, a pivotally mounted draft pole and means for angularly moving said pole to different positions relative to the line of draft of the machine and including a laterally movable, pivoted supporting member, and means for angularly moving said pole to different angular positions relative to the line of draft of the machine and including a worm shaft conjoined with the pole, a shaft mounted upon the pole and extending parallel thereto, a bracket pivoted upon the frame of the machine for rotation on an axis coincident with the axis of oscillation of the draft pole, an operating shaft comprising a plurality of flexibly connected sections, one of said sections being mounted in said bracket for axial rotation and rotation with the bracket around the axis of the bracket, another section having a universal joint connection with the last named section and extending downward to and having a universal joint connection to the shaft carried by the pole, and a section rearward of the section mounted on the bracket and having a universal joint connection therewith.

In testimony whereof, I hereunto affix my signature.

FRANKLIN E. ARNDT.